United States Patent [19]

Frazar

[11] Patent Number: 5,001,858
[45] Date of Patent: Mar. 26, 1991

[54] TREE TRIMMING APPARATUS AND METHOD

[76] Inventor: John Frazar, 1980 La Costa Ave., Carlsbad, Calif. 92009

[21] Appl. No.: 416,398

[22] Filed: Oct. 3, 1989

[51] Int. Cl.$^5$ .............................................. B27B 17/02
[52] U.S. Cl. ......................................... 47/8; 30/296.1; 56/332
[58] Field of Search ............... 47/4, 8; 56/332; 83/13; 30/296.1; 248/431, 432

[56] References Cited

U.S. PATENT DOCUMENTS

| | | | |
|---|---|---|---|
| 1,801,087 | 4/1931 | Johnson | 248/164 |
| 2,504,856 | 4/1950 | Luplow | 47/8 |
| 3,767,149 | 10/1973 | Hill | 248/49 |
| 4,207,675 | 6/1980 | Causey et al. | 30/296.1 |
| 4,341,017 | 7/1982 | Janczak | 30/381 |
| 4,483,070 | 11/1984 | Junkermann | 30/381 |
| 4,638,562 | 1/1987 | Drake | 30/296.1 |
| 4,644,654 | 2/1987 | Howe et al. | 30/296 |
| 4,654,971 | 4/1987 | Fettes et al. | 30/383 |
| 4,717,108 | 1/1988 | Liedle | 248/432 |
| 4,733,470 | 3/1988 | Firman | 30/231 |
| 4,747,213 | 5/1988 | Armstrong | 30/296 |
| 4,777,787 | 10/1988 | Warren | 56/235 |

FOREIGN PATENT DOCUMENTS

| | | | |
|---|---|---|---|
| 211979 | 7/1909 | Fed. Rep. of Germany | 47/8 |
| 2525783 | 12/1977 | Fed. Rep. of Germany | 30/323 |

Primary Examiner—Hien H. Phan
Assistant Examiner—John M. Husar
Attorney, Agent, or Firm—Nydegger & Associates

[57] ABSTRACT

A plant trimming apparatus comprises a cutting device operated in conjunction with a support apparatus. The cutting device includes an elongated handle member attached to a cutter, the cutter being preferably an electrical chain saw or tree trimmer. A power cord for the electric cutter is carried through a hollow portion of the handle to an electrical outlet or generator which provides power. The handle is preferably a hollow PVC tube. The handle is supported by a fulcrum apparatus which provides leverage for manipulating the cutter. The fulcrum apparatus comprises a pair of hollow tubes hingedly connected together to provide a V-shaped fulcrum point in which the handle rests. A third leg of pipe is hingedly connected to one of the legs, further down from the fulcrum point, to act as a third leg of a tripod. The third leg can be raised and held in the operator's hand for moving the fulcrum point fore and aft during the cutting operation. The blade of the cutter is mounted so that it forms an angle with the longitudinal axis of the handle, to allow different angles to be obtained in the cutting process by the user rotating the handle. In addition, the materials used provide little friction to allow the handle to slide easily in the V-shaped fulcrum.

14 Claims, 2 Drawing Sheets

TREE TRIMMING APPARATUS AND METHOD

FIELD OF THE INVENTION

This invention relates generally to apparatus and methods for trimming trees and shrubs. More specifically, the invention relates to a tree trimming method and apparatus which can be used to trim the high branches of trees and shrubs by one person. The present invention is particularly, though not exclusively, useful for pruning and trimming of trees and shrubs without the user being required to place himself in an elevated position.

BACKGROUND OF THE INVENTION

In the past, there have been many different devices proposed for trimming high branches from trees and shrubs. Trimming or pruning of trees, as well as trimming of shrubs, into desired shapes is desirable with respect to landscaping efforts. To effectively cut or trim trees, especially those in the range of ten to fifteen feet in height, it is necessary to use a ladder or other means to elevate the person handling the cutter in order to trim the plants. In some instances, the user can climb the tree himself. In any event, during any use of a chain saw, hedge trimmer or other type of cutting apparatus, there is always a danger that the tool can cut the user thereof. In addition, in instances where the user is elevated, there is a danger of falling. In order to minimize the risk and thus associated costs for performing such tasks, two-man crews are often utilized, with one man to hold the ladder or operate the device for elevating the user, such as a "cherry picker" type device. Unfortunately, this method involves more time, cost, and expense, and has associated risk of injury to the user.

Consequently, there have been a number of devices proposed in the prior art which do not require that the user be elevated. Instead, they adopt an extendable handle of various kinds which allow the user to remain on the ground. The user then operates the cutter blade at the end of an elongated extendable member to be able to cut high branches. Unfortunately, such devices are cumbersome and costly to operate. In addition, they typically require considerable strength of the operator for use during any extended length of time.

One such tree pruning and clearing apparatus is that disclosed by U.S. Pat. No. 4,341,017 to Janczak, which discloses a "Tree-Pruning and Clearing Apparatus" having a guide bar mounted on the handle. The chain saw is mounted on the guide bar at one end of the handle. It is driven by a hydraulic motor and separate portable drive unit located near the opposite end of the handle, and is carried on the person. It is designed in this fashion so that the drive unit may be carried on the user directly to allow less weight at the cutting end so that it is less tiresome to operate. Unfortunately, it is rather complicated, and may still become tiresome to operate. Also, it cannot reach the heights often needed to effectively trim trees and large shrubs.

Another device used for extending the reach of an electrically-powered hand tool, such as an electrically-powered chain saw, is that disclosed in U.S. Pat. No. 4,207,675 to Causey et al. for an "Adjustable Utility Extension Handle for Electrically Powered Handtool". It is designed to allow a large number of electrically-powered handtools to be interchangeably coupled to the end of an elongated support tool. This apparatus discloses a complicated tool coupler apparatus in conjunction with an elongated support pole. Unfortunately, since this apparatus has the power driving motor at the end of the support pole, it is heavier at the end. Thus, handling this apparatus would be difficult as shown, and the user may quickly become tired in extensive use thereof. In the commercial landscaping business, it may often be necessary to trim a large number of trees and shrubs in succession. Therefore, using a device such as this is not practical or cost-effective in most, if not all, instances of commercial applications.

In light of these limitations, the present invention recognizes the need for a tree and shrub trimming apparatus which enables a user to effectively trim trees and shrubs at high elevations while remaining on the ground. The present invention further recognizes that there is a need for such an apparatus which is easy to manipulate and which allows the user to perform many cutting operations with relatively little effort. The present invention recognizes that this need may be satisfied by providing a tree trimming apparatus which allows the user to remain on the ground and efficaciously manipulate a cutter about a high portion of a tree or shrub in a controlled fashion.

Accordingly, it is an object of the present invention to provide a method and apparatus for trimming trees and shrubs which allow a user to reach high places with a cutter without the need for elevating the user. It is yet another object of the present invention to provide a tree trimming method and apparatus which are effective and accurate in their operation. It is yet another object of the present invention to provide a tree trimming method and apparatus which require relatively little effort to be exerted by the user in the manipulation and control of the movement of the cutter. Another object of the present invention is to provide a tree trimming apparatus which is simple and convenient in operation, and cost-effective in its manufacture.

SUMMARY OF THE INVENTION

A preferred embodiment of the method and apparatus for tree trimming comprises an elongated cylindrical pipe handle adapted to hold a cutting device, such as an electric chain saw or hedge trimmer apparatus. The elongated pipe handle has a trigger switch located in the middle of the pipe which the user uses to control operation of the cutter, and for rotating the handle and thus the cutter. Also, included is a support fulcrum apparatus, for slidably supporting the elongated pipe handle to allow the user to move the elongated pipe handle, and thus the cutter, in a desired path about the tree which is being trimmed. The fulcrum comprises first and second elongated legs which are hingedly joined at a first point. A third elongated leg is hingedly joined to the first leg at a second point, further down from the first point. The first and second legs form a "V" in which the elongated handle rests. The blade of the cutter is connected at an angle to the longitudinal axis of the elongated pipe. When the user rotates the handle, different cutting angles can be obtained during the cutting process. Preferably, the legs and elongated pipe are made from PVC pipe, typically in ten foot sections, which provides little friction. Thus, the handle extension can slide easily in the V-shaped fulcrum point. Flexible lines are adjustably connected between the legs to allow the fulcrum support to stand on its own, similar to a tripod or tepee. The cutter is adapted to be connected to various length elongated handle extensions.

In operation, the user positions the support next to the tree and adjusts the line between the first and second legs. This establishes the fulcrum support height. The user then lifts the third leg to move the fulcrum point fore and aft with respect to the tree which further affects the height of the fulcrum point. One end of the elongated cutter handle is grasped by the other hand of the user, with the elongated handle resting in the fulcrum support point to provide leverage for manipulating the cutter with relative ease and little effort. The materials are light enough to provide adequate support, yet light weight for ease in moving the fulcrum tripod to desired locations about the tree or shrub to be trimmed.

The novel features of this invention, as well as the invention itself, both as to its structure and its operation, will be best understood from the accompanying drawings, taken in conjunction with the accompanying description, in which similar reference characters refer to similar parts, and in which:

DETAILED DESCRIPTION OF THE PREFERRED EMBODIMENT

Figure 1:
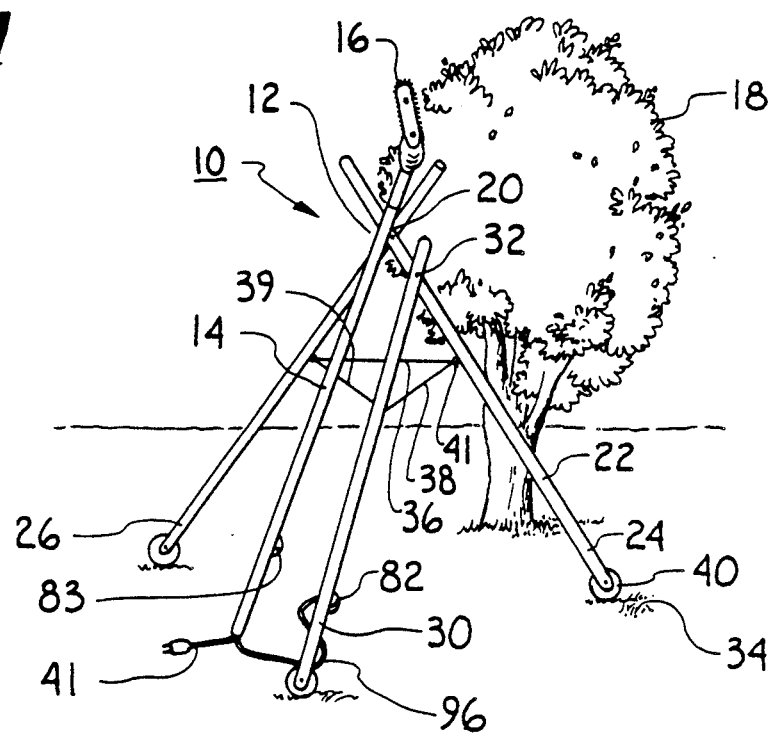
FIG. 1 is a perspective view of the plant trimming apparatus in its intended environment.
Figure 2:
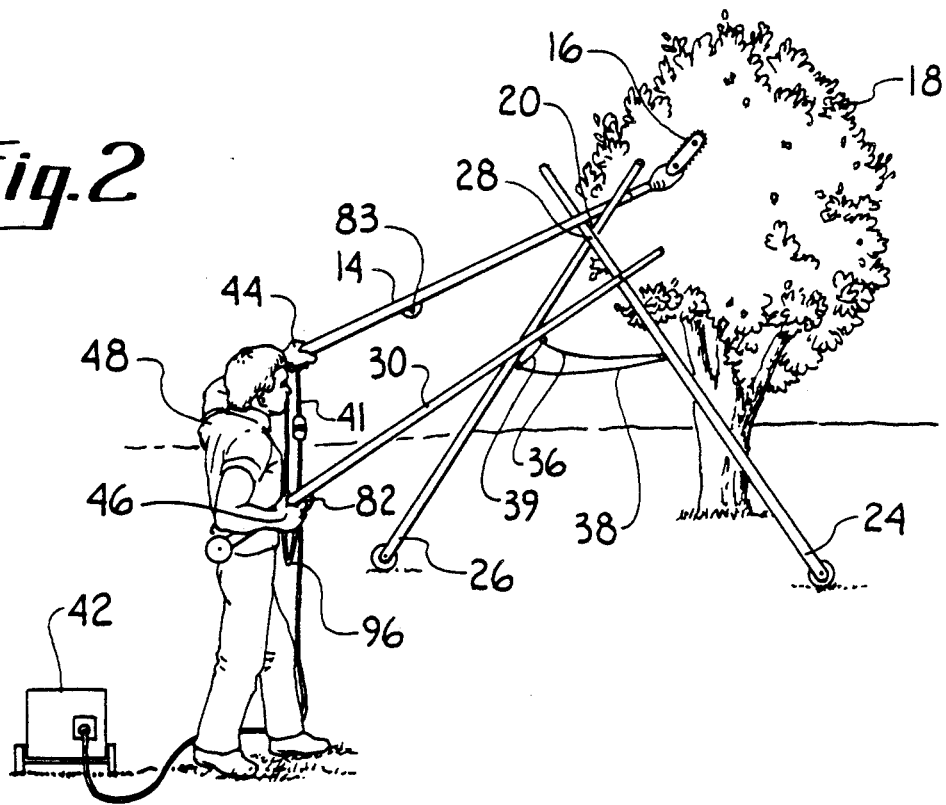
FIG. 2 is a perspective view of the plant trimming apparatus as being used in its intended environment.

Referring initially to FIGS. 1 and 2, there is shown an apparatus for trimming plants, generally designated 10, being shown in its intended environment. Trimming apparatus 10 comprises a cutting device 12 having an elongated handle member 14 having a cutter 16 attached to the end thereof for trimming plant 18, shown as a small tree or large shrub. Plant 18, as shown, is approximately between ten (10) to fifteen (15) feet in height. Elongated handle member 14 is a hollow cylindrical tube or pipe made of strong, yet light weight material. A preferred material is PVC pipe, and in the preferred embodiment, may be an eight (8) to ten (10) foot section of two (2) inch outside diameter PVC pipe. In the embodiment shown, cutter 16 is any cutter suitable for trimming or pruning trees or shrubs, and is shown as a chain saw. Another device just as likely to be utilized could be a hedge trimmer or other device for cutting plants.

Cutting device 12 is supported on a fulcrum 20 which is provided by support apparatus 22. Support apparatus 22 comprises a pair of elongated leg members 24, 26 hingedly connected together by pin 28. Leg members 24, 26 are elongated light weight, yet sturdy, material items. In the preferred embodiment, they are likewise ten (10) foot sections of two (2) inch diameter PVC pipe. A third leg member 30 is hingedly connected to leg member 24 at pin 32. Third leg member 30 is likewise preferably a light weight sturdy material and in a preferred embodiment is also a ten (10) foot section of two (2) inch diameter PVC pipe. A connecting line 36 connects leg 24 to leg 26 so that in a resting position, the legs 24, 26 are prevented from spreading more than a desired amount in the event that the ground 34 is unable to hold legs 24 and 26 in a desired orientation as further described below. There is likewise connecting lines 38, 39 connected between third leg 30 and each of legs 24, 26, respectively. These lines 38, 39 also hold third leg member 30 at a desired angle with respect to leg member 24 when the apparatus 22 is not in use as shown in FIG. 1. The lines 36, 38, 39 may conveniently include conventional apparatus, such as sailor hitch 41 for adjusting the lengths of lines 36, 38, 39 to determine the orientation and thus height of fulcrum 20. When not in use, therefore, the apparatus stands on its own similar to a tepee arrangement, as shown. Wheels 40 are rotatably mounted at the end of legs 24, 26 to allow convenient movement of support apparatus 22.

Preferably, cutter 16 is an electric cutting apparatus, such as a chain saw or hedge trimmer. Accordingly, a power/control cord 41 is connected to a power source 42 for providing electric power to the cutter. In the alternative, cutter 16 could be a battery powered electric cutter in the event that a power source, such as a portable generator or extension cord is not available.

Figure 3:
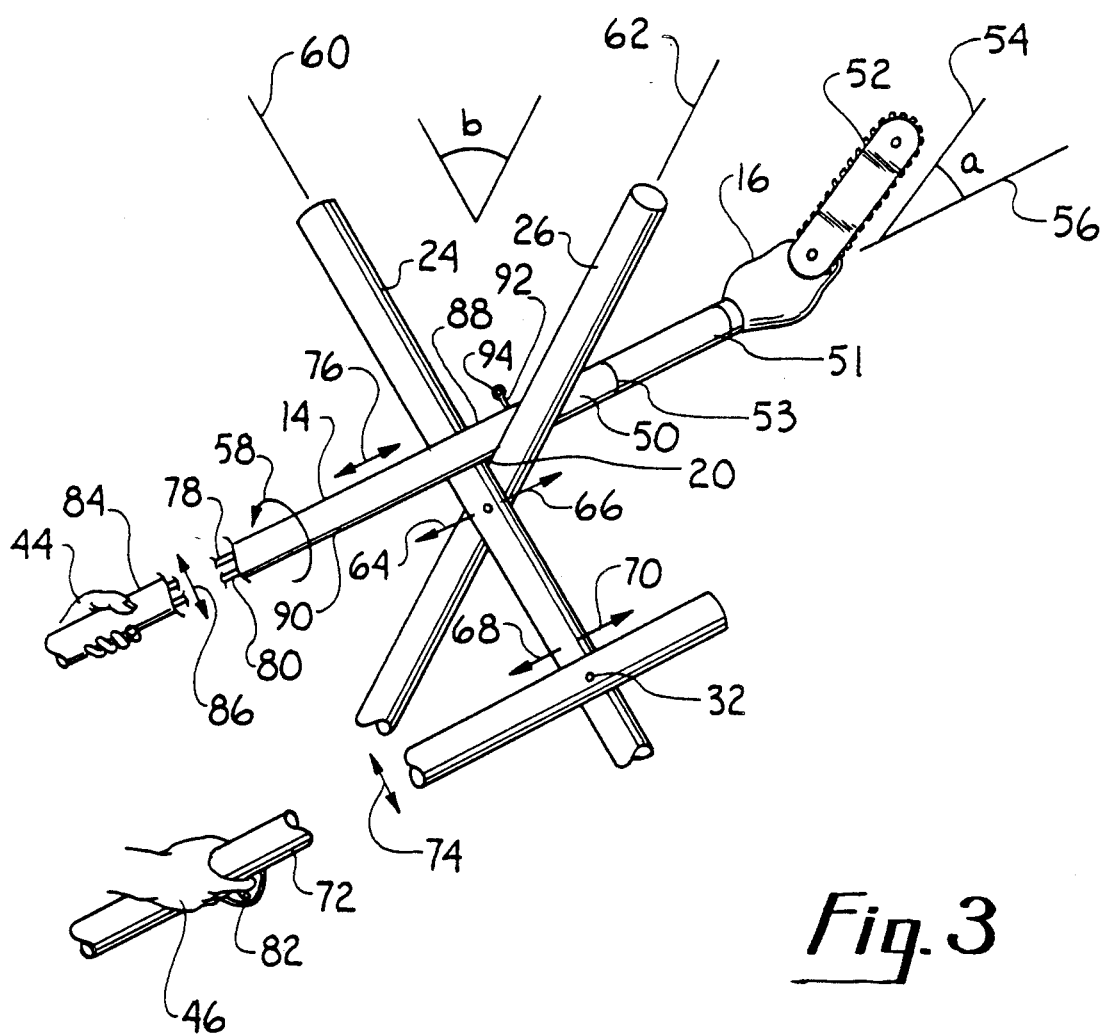
FIG. 3 is a perspective view of portions of the apparatus illustrating cooperation of the elements thereof.

Cooperation of the various elements of the apparatus for tree trimming is perhaps best illustrated further with respect to FIG. 3. Hands 44 and 46 of user 48 are illustrated in operation of the device. In particular, it can be appreciated with respect to FIG. 3 that cutter 16 is removably attached to end 50 of handle 14. Thus, cutter 16 preferably has a modified handle attachment 51 which is adapted to be mounted on a conventional cutter, and has connections for mating cutter 16 to end 50 of handle 14 at connection 53. Cutter 16 has a blade 52 which has an angle of cut generally parallel to line 54. The angle of cutting action 54 is at an angle "a" with respect to the longitudinal axis 56 of handle 14. This permits, by rotating handle 14 about longitudinal axis 56 as illustrated by arrow 58, differing angles of cut for trimming plant 18.

In addition, fulcrum 20 is established at a given height by properly choosing the lengths of legs 24, 26, and further determining the angle "b" between legs 24, 26, legs 24, 26 each having a longitudinal axis 60, 62, respectively for forming the angle b. Fulcrum 20 can be moved fore and aft with respect to plant 18 as indicated by arrows 64, 66, respectively. The movement in the direction of arrows 64, 66, respectively, is caused by the user's hand 46 moving third leg 30 generally in the directions of arrow 68, 70, respectively. In addition, end 72 of third leg 30 can be moved up and down as shown by arrow 74 to conveniently accommodate the height of the user. In addition to adjustably being able to conveniently move the fulcrum point to adjust its height from the ground 34 and to adjust its fore and aft motion with respect to plant 18, handle 14 can be slidingly moved in the V-shaped fulcrum generally in the direction shown by arrow 76. By properly choosing materials, such as PVC pipe which provides little or no friction therebetween, the handle 14 carrying cutter 16 can be conveniently slid fore and aft in fulcrum 20. In addition, the fulcrum itself may be conveniently moved by operation of third leg 30 in the right hand 46 of user 48. There is further shown power cord 78 and control cord 80 operatively engaged with cutter 16 travelling through the hollow center of handle 14 and attached by a cord 96 to a control trigger switch 82 mounted to leg 30, which is conveniently operated by the user's hand 46. In addition, the height of cutter 16 may further be adjusted by user's hand 44 moving end 84 of handle 14 generally in the direction shown by up and down arrow 86. A second trigger switch 83 may also be included on handle member 14 at a desired distance from end 84, such as four (4) to five (5) feet, to allow use of handle member 14 alone.

It can be seen by the amount of leverage provided by fulcrum 20, and the relative lengths of handle portion 88 extending past the fulcrum 20, as opposed to the length of handle portion 90 between fulcrum 20 and user's hand 44, that there is relative ease of movement of cutter 16. In addition, due to the difference in the moment arm lengths, less work is required by the user to movably support a relatively heavy cutter 16. Moreover, by adjusting line 36 to establish fulcrum 20 at the desired height and orientation with respect to tree 18, and by proper manipulation to various locations with respect to plant 18, a smooth defined path of cutting action can be readily obtained by the user 48 for trimming the plant 18 in desired fashion. In addition, legs 24, 26 and 30 may be effectively extended appropriately to raise fulcrum 20, such as by coupling additional ten (10) foot lengths of pipe to the ends of the legs. Such additional extensions would, of course, include necessary handles and connectors to operate the apparatus.

Also shown is an eye bolt 92 mounted on elongated handle member 14. Eye bolt 92 has eye portion 94 through which a rope or line may be passed, and looped over a high limb on tree 18. Pulling on the rope lifts the handle member 14 and cutter 16 to a high position in the tree 18.

While the particular tree trimming apparatus and method as herein shown and disclosed in detail is fully capable of obtaining the objects and providing the advantages herein before stated, it is to be understood that they are merely illustrative of the presently preferred embodiments of the invention and that no limitations are intended to the details of construction or design herein shown other than as defined in the appended claims.

What is claimed is:

1. An apparatus for trimming plants with a cutter comprising:
   an elongated handle for holding the cutter; and
   a tripod having first and second elongated members defining respective longitudinal axes and being hingedly joined at a first point, and a third elongated member hingedly joined to said first elongated member at a second point, said second point being axially offset at a lower level from said first point relative to said first member for movably supporting said handle to allow a user to move said handle and said cutter in a desired path about said plant.

2. An apparatus for trimming plants with a cutter as recited in claim 1, further comprising adjustable connecting means coupled between said first and second members for establishing an angle of intersection therebetween.

3. An apparatus for trimming plants with a cutter as recited in claim 2, further comprising flexible connecting means coupled between said first and third members for establishing an angle of intersection therebetween.

4. An apparatus for trimming plants with a cutter as recited in claim 1, wherein said elongated handle comprises a rigid cylindrical tube.

5. An apparatus for trimming plants with a cutter as recited in claim 2, wherein said elongated members comprise PVC pipe.

6. An apparatus for trimming plants with a cutter as recited in claim 1, wherein said cutter is an elongated cutter defining a longitudinal line of cutting action, said elongated handle has a longitudinal axis, and said cutter is coupled to said elongated handle with said line of cutting action defining an oblique angle with said longitudinal axis of said handle.

7. An apparatus for trimming plants with a cutter as recited in claim 6, wherein said cutter is a chain saw.

8. A method for trimming a plant with a cutter comprising the steps of:
   attaching an elongated handle to a plant cutter;
   providing a fulcrum at a predetermined height adjacent said plant, said fulcrum having first and second elongated members defining respective longitudinal axes and being hingedly joined at a first point, and a third elongated member hingedly joined to said first elongated member at a second point for selectively moving said fulcrum, said second point being axially offset at a lower level from said first point relative to said first member; and
   movably supporting said elongated handle at said fulcrum for allowing said cutter to be moved in a path about said plant to trim said plant.

9. A method for trimming a plant with a cutter as recited in claim 8, further comprising the step of moving said fulcrum fore and aft with respect to said plant moving one end of said third elongated member.

10. A method for trimming a plant with a cutter as recited in claim 9, further comprising the step of rotating said elongated handle about its longitudinal axis, and wherein said cutter is attached to said handle to form an oblique cutting angle with said elongated handle axis.

11. An apparatus for trimming a plant with a conventional electric cutter, comprising:
    an elongated pole having a first end and a second end;
    means coupled to said first end for controlling activation of said cutter;
    means coupled to said second end for removably securing said cutter to said pole; and
    first and second elongated members defining respective longitudinal axes and being hingedly joined at a first point to form a V-shaped fulcrum for slidably supporting said pole, and a third elongated member hingedly joined to said first elongated member at a second point for selectively moving said fulcrum, said second point being axially offset at a lower level from said first point relative to said first member.

12. An apparatus for trimming a plant with a conventional electric cutter as recited in claim 11, further comprising means for adjusting the height of said pole.

13. An apparatus for trimming a plant with a conventional electric cutter as recited in claim 11, wherein said pole and tripod are made of hollow PVC pipe.

14. An apparatus for trimming a plant with a conventional electric cutter as recited in claim 11, wherein said cutter is an electric chain saw.

* * * * *